G. CODISH.
ARMOR FOR PNEUMATIC TIRES.
APPLICATION FILED SEPT. 7, 1920.
1,382,474. Patented June 21, 1921.
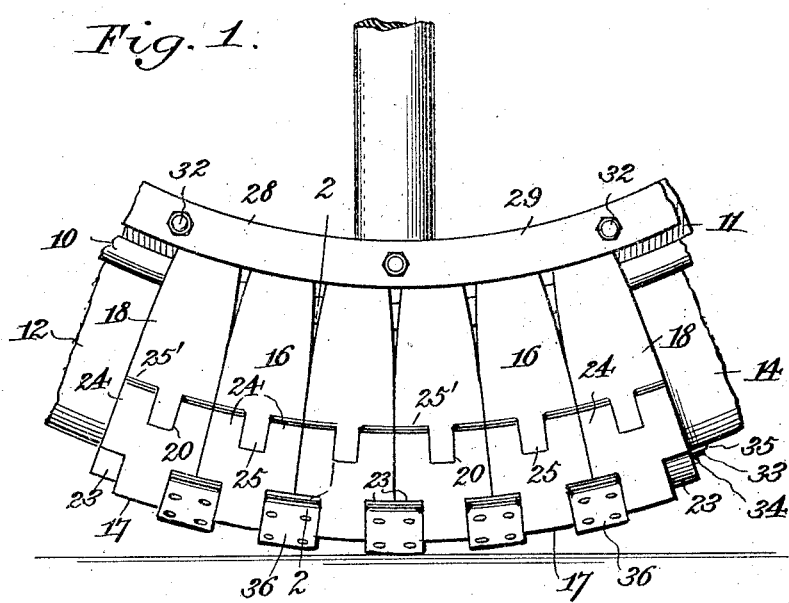
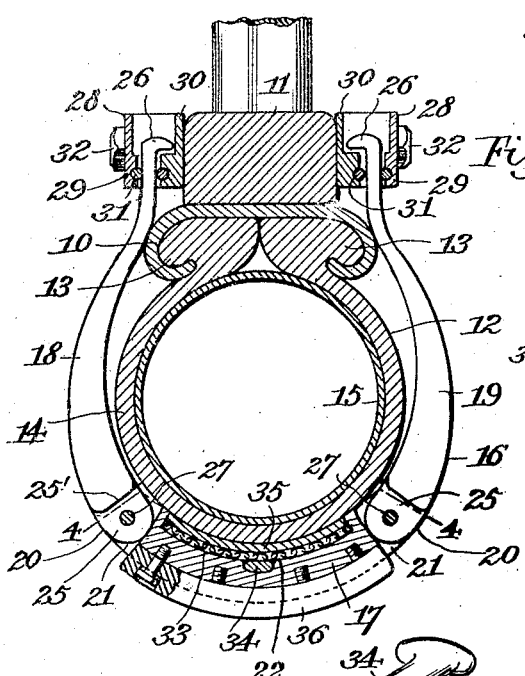
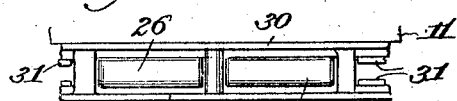
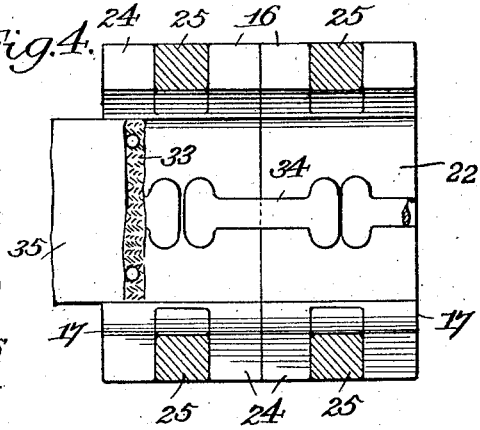
George Codish,
INVENTOR.
BY Victor J. Evans,
ATTORNEY.
WITNESS:

UNITED STATES PATENT OFFICE.

GEORGE CODISH, OF BROOKLYN, NEW YORK.

ARMOR FOR PNEUMATIC TIRES.

1,382,474.   Specification of Letters Patent.   Patented June 21, 1921.

Application filed September 7, 1920. Serial No. 408,500.

*To all whom it may concern:*

Be it known that I, GEORGE CODISH, a citizen of the United States, residing at Brooklyn, in the county of Kings and State of New York, have invented new and useful Improvements in Armors for Pneumatic Tires, of which the following is a specification.

This invention relates to armors for pneumatic tires. Some of the objects of the present invention are: to produce an armor of sections which are connected together by a single piece of resilient and elastic material which holds the sections normally side by side and yieldably related; to correlate an inexpensive pneumatic structure and an armor which renders said structure puncture-proof, the armor to possess flexibility of a kind so as to render the armor more practically susceptible to the yielding action of the pneumatic structure; to provide an armor for pneumatic tires which is composed of sections having relative compound movement; to provide an armor for pneumatic tires which embodies resilient wear and anti-skid elements. With these and other objects in view the invention resides in the particular provision and arrangement of parts more fully described in the following specification and illustrated in the accompanying drawing, in which:

Figure 1 is a side elevation of a portion of the tire structure and the armor therefor of the present invention.

Fig. 2 is a transverse sectional view on the line 2—2, Fig. 1.

Fig. 3 is a detail view of the securing means forming a part of the invention.

Fig. 4 is a detail sectional view on the line 4—4, Fig. 2.

Fig. 5 is a detached perspective view of one of the connector elements forming a part of the present invention.

It is within the present invention to produce a pneumatic tire structure of comparatively inexpensive materials and to this end there is provided an ordinary clencher rim 10 which is secured to a felly 11 forming a part of a vehicle wheel. A shoe 12 which is similar to shoes in common use as regards the beads 13, is included in the tire structure, but the shoe of the present use is without the expensive rubber carcass, and tread surface, having only a preferably fabric inner tube receiving portion 14. An inner tube 15 is employed to inflate the shoe 12.

The armor of the present invention consists of a plurality of interconnected sections of such number as to completely surround or inclose the shoe 12 of the tire structure. The sections 16 are each composed of parts 17, 18 and 19, which are jointed as at 20—20. The part 17 will be disposed lowermost with respect to the road surface. Each part 17 is arcuate, bifurcated at each end as at 21, recessed as at 22, and as at 23—23. The furcations 24 of the opposite ends of the part 17 are provided with alined apertures to receive a bolt. Each of the left and right parts 18 and 19 respectively, are reduced to provide portions 25 which is received between the furcations 24, and each of said parts is provided with shoulders 25', and a bill 26. The parts 17, 18 and 19, as stated, are connected together, and to this end bolts 27 are provided.

In order to secure the sections 16 in place, there is provided securing means 28 at opposite sides of the felly 11. The securing means consists of component parts 29 and 30, which are so formed as to provide apertures through which the upper ends of the parts 18 and 19 extend. Anti-friction rollers 31 are arranged at the apertures. The parts 29 and 30 are held in place by bolts or studs 32. The bills 26 prevent the ends of the parts 18 and 19 from passing out through the apertures in which the upper ends of the said parts move. It will now be manifest that the sections 16 by virtue of the joints in the use of the bolts 32, and the relative disposition of the parts 18 and 19, and the securing means 28, may have movement in accordance with the yielding action of the tire structure.

In order to render the sections 16 more efficiently responsive to the yielding action of the tire structure, a metallic mesh element 33 is employed. This element 33 is arranged in the recesses 22 in the parts 17, and it is attached to each of the parts 17 to connect all of said parts together. The function of the element 33 is supplemented by connectors 34, each of which is disposed in a recess extending in two of the parts as shown in Fig. 4. A member 35 preferably of rubber underlies the element 33 to prevent undue wear of the shoe 12.

In order to render the whole structure non-skid, and to meet conditions of wear, resilient members 36, preferably of rubber are secured in the cavities formed by the recesses 23—23, in any suitable manner.

What is claimed is:

1. An armor for tires including a plurality of sections, and a pair of flexible elements, one of said elements connecting said sections, each of said elements being in the nature of a single length of material and being disposed in a recess in the inner tire engaging periphery of the armor.

2. An armor for pneumatic tires including a plurality of sections, a pair of flexible elements, one of said elements connecting said sections to hold them normally side by side and allowing them to have relative compound movement, one of said elements being metallic and the other of said elements being non-metallic, and loose connectors connecting said sections.

3. An armor for pneumatic tires including a plurality of interconnected sections having wear pieces, each of said sections having a recess, flexible elements, one of said elements being in the nature of a single piece of material and being attached to each of said sections to normally hold the sections contiguous to each other and allowing the sections to have relative compound movement and being disposed so as to be received by the recesses in the sections.

4. An armor for tires comprising a plurality of sections connected together and having relative movement and each of which comprises a plurality of jointed parts, certain of said parts having bills, securing means embodying anti-friction rollers for securing said sections in place about said tire and for permitting the same to have relative movement with respect thereto.

5. An armor for pneumatic tires including a plurality of recessed sections constituting a grooved body having tread members and attaching extensions, a resilient element connecting said sections and disposed in the groove in said body, and a flexible element underlying said first element.

6. An armor for pneumatic tires including a plurality of recessed sections constituting a tread body grooved in the tire-side thereof, a metallic mesh element connecting said sections and disposed in said groove permitting the sections to have relative compound movement, each of said sections including relatively movable parts certain of which serve for the attaching of said sections with relation to the tire.

7. An armor for a pneumatic tire including a plurality of recessed sections constituting a tread body grooved in the tire-side thereof, a flexible element connecting said sections and disposed in said groove permitting the sections to have relative compound movement, a flexible member arranged in said groove and underlying said element, and means for securing the sections in place about said tire.

In testimony whereof I have affixed my signature.

GEORGE CODISH.